(12) United States Patent
Neithalath et al.

(10) Patent No.: US 12,333,398 B2
(45) Date of Patent: Jun. 17, 2025

(54) INTEGRATION OPTIMIZATION USING MACHINE LEARNING ALGORITHMS

(71) Applicant: Dell Products L.P., Round Rock, TX (US)

(72) Inventors: Navin Kumar Neithalath, Bangalore (IN); Navnit Varu, Austin, TX (US); Venkata Kishore Kumar Reddy Chintham, Kadapa (IN); Bijan Kumar Mohanty, Austin, TX (US); Hung Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1075 days.

(21) Appl. No.: 17/025,023

(22) Filed: Sep. 18, 2020

(65) Prior Publication Data

US 2022/0092481 A1  Mar. 24, 2022

(51) Int. Cl.
  *G06N 5/01* (2023.01)
  *G06N 5/04* (2023.01)
  (Continued)

(52) U.S. Cl.
  CPC .............. *G06N 20/20* (2019.01); *G06N 5/04* (2013.01)

(58) Field of Classification Search
  CPC .................................. G06N 20/20; G06N 5/04
  See application file for complete search history.

(56) References Cited

U.S. PATENT DOCUMENTS

| | | | |
|---|---|---|---|
| 2008/0126546 A1* | 5/2008 | Peddada | G06F 9/5055 709/226 |
| 2014/0180738 A1* | 6/2014 | Phillipps | G06N 20/10 705/7.38 |

(Continued)

OTHER PUBLICATIONS

Boomi, "Understanding Try/Catch Shape Behavior," https://community.boomi.com/s/article/ understand ingtrycatchshapebehavior#:-: text= Try%2FCatch, Oct. 28, 2018, 5 pages. (Year: 2015).*

(Continued)

*Primary Examiner* — Kamran Afshar
*Assistant Examiner* — Steven H Phung
(74) *Attorney, Agent, or Firm* — Ryan, Mason & Lewis, LLP

(57) ABSTRACT

A method comprises receiving configuration data comprising a plurality of parameters of at least one computing environment. One or more of the parameters correspond to integration of one or more elements of the least one computing environment with one or more other elements at least one of within and external to the least one computing environment. In the method, the parameters are analyzed to detect one or more anomalies in the configuration data, and the configuration data and the one or more detected anomalies are inputted to one or more machine learning models. The method also comprises determining, using the one or more machine learning models, one or more modifications to at least one of the plurality of parameters based on the inputted configuration data and one or more detected anomalies, and transmitting the determination comprising the one or more modifications to a user over a communications network.

20 Claims, 14 Drawing Sheets

(51) Int. Cl.
*G06N 7/01* (2023.01)
*G06N 20/20* (2019.01)

(56) References Cited

U.S. PATENT DOCUMENTS

| | | | | |
|---|---|---|---|---|
| 2016/0246809 | A1* | 8/2016 | Romano | G06F 16/254 |
| 2017/0270432 | A1* | 9/2017 | Sachdev | H04L 41/16 |
| 2019/0065172 | A1* | 2/2019 | Nachimuthu | H04L 67/1008 |
| 2021/0073660 | A1* | 3/2021 | Zhang | G06N 5/04 |
| 2021/0303440 | A1* | 9/2021 | Rodgers | G06F 11/3065 |
| 2022/0058511 | A1* | 2/2022 | McCusker | G10L 15/063 |

OTHER PUBLICATIONS

Wikipedia, "Splunk," https://en.wikipedia.org/wiki/Splunk, Jul. 29, 2020, 6 pages.
Wikipedia, "Regular Expression," https://en.wikipedia.org/wiki/Regular_expression, Jul. 29, 2020, 22 pages.
J. Shubham, "Ensemble Learning—Bagging and Boosting," Becoming Human: Artificial Intelligence Magazine, https://becominghuman.ai/ensemble-learning-bagging-and-boosting-d20f38be9b1e, Jul. 3, 2018, 8 pages.
Dell Technologies, "Boomi," Company Overview, 2019, 2 pages.
Boomi, "Understanding Try/Catch Shape Behavior," https://community.boomi.com/s/article/understandingtrycatchshapebehavior#:~: text=Try%2FCatch, Oct. 28, 2018, 5 pages.
W3schools, "Java Exceptions—Try . . . Catch," https://www.w3schools.com/java/java_try_catch.asp, Accessed Aug. 7, 2020, 10 pages.
Tech Blog, "Hyper-V VM Integration Services," https://ramprasadtech.com/hyper-v-vm-integration-services/, Accessed Aug. 12, 2020, 24 pages.
J. Rocca et al., "Ensemble Methods: Bagging, Boosting and Stacking," Towards Data Science, https://towardsdatascience.com/ensemble-methods-bagging-boosting-and-stacking-c9214a10a205, Apr. 22, 2019, 28 pages.
Boomi, "Decision Shape," Boomi Integration AtomSphere User Guide, https://help.boomi.com/bundle/integration/page/r-atm-Decision_shape.html, Accessed Aug. 17, 2020, 3 pages.

* cited by examiner

600

| Resource ID | Resource Name | Resource Type | Is Name Valid | Recommendation/Valid Name Format |
|---|---|---|---|---|
| 012ab345c67890lde23f | CPSD_SF_Opportunity_QUERY_Response | profile.xml | Not Valid | {descriptionWithdelimiter}_{profileType} |
| 01a2b345678c9defgh | check_Oppty_or_OLI | transform.function | Not Valid | {descriptionWithOutDelimiter} |
| 01a2b345f67c8d9e | Dell_SF_User_QUERY_Response | profile.xml | Not Valid | {descriptionWithdelimiter}_{profileType} |
| 0a12345678b901 | getUnitPrice_CPSD | connector-action | Not Valid | {operationType}{descriptionWithdelimiter} |
| 01a234567b8c9d0ef1gh | Email_Connection | connector-settings | Not Valid | {connectorType}{systemname}{descriptionWithOutDelimiter} |

| Connector ID | Connector Name | Duplicate Connector Details | Recommendation |
|---|---|---|---|
| 01a234bc56de78f9g01h | CRMService_CPSD | 0a12bc3d456e78f90gh12345678 :: CRMService_CPSD<br>012ab3c4d5e67890f1g2345h67 :: CRMService_CPSD | Connectors already available with same configuration as "CRMService_CPSD". Please reuse existing connector to save license costs and better code maintenance. |

| Dynamic Process Property/Process Propery | Static Value | Environment Extension Enabled | Recommendation |
|---|---|---|---|
| DPP_Dell_AccountID | ab123cde4 | False | Dynamic Process Property "DPP_Dell_AccountID" is not enabled for environment extension. This leads to code change in higher environment. To avoid code change please enable "DPP_Dell_AccountID" for environment extensions. |

<DATE> <TIME> WARNING    [com.boomi.process.shape.DecisionShape execute] The decision name is  =Error?

<DATE> <TIME> SEVERE [com.boomi.execution.ExecutionTask returnResults] Failed returning results for ExecutionTask[execution-a123456b789c0de12f3456-2020.04.16] a123b4567c8d9ef0123456 (processes/a123b4567c8d9ef0123456)

<DATE> <TIME> SEVERE [com.boomi.execution.ExecutionTask returnResults] Failed returning results for ExecutionTask[execution-12a3bcde4f5g6789hijkl0mn-2020.04.16] a123b4567c8d9ef0123456 (processes/a123b4567c8d9ef0123456) java.lang.ArrayIndexOutOfBoundsException <DATE> <TIME> SEVERE [com.boomi.connector.server.queue.ActiveMQQueueService$Listener$ListenerSessionImpl$ListenerImpl onMessage] MessageListenerSession[dellboomiinternal-RHIVUR]Listener[OCI_AtomQueue_OrderStatus_Queue] failed handling message: com.boomi.message.MessageException: QueueListener[Account[dellboomiinternal-RHIVUR], process: 12345ab678cd90efg123, queue: OCI_AtomQueue_OrderStatus_Queue] failed handling message batch <DATE> <TIME> SEVERE [com.boomi.process.ProcessExecution handleProcessFailure] Unexpected error executing process: com.boomi.connector.ConnectorException: java.util.NoSuchElementException: Timeout waiting for idle object

```
import numpy as np
import pandas as pd
from sklearn.model_selection import traintest_split
from sklearn.ensemble import RandomForestClassifier
from sklearn.metrics import accuracy_score
from sklearn.metrics import confusion_matrix
from sklearn.tree import DecisionTreeClassifier
from sklearn import tree import warning filter
from warnings import simplefilter
#import all future warning
simplefilter(action='ignore', category=FutureWarning)

runtime_data = pd.readcsu("data/runtimeData.csv",sepg ',',
header= None)
print (runtime data)
print ("Dataset Length:: ", len(runtime data))
print ("Dataset Shape:: ", runtimedata.shape)
```

```
X_train, X_test, y_train, y_test = train_test_split( X, Y,
test_size = 0.3, random_state = 100)
print(X_train)
print(Xtrain.shape)
print(Xtest.shape)
print(y_train.shape)
print(y_test.shape)

y_train = y_train.astype('int')
y_test = y_test.astype('int')

print(y_train)

trained_model = RandomForestClassifier()
trained_model.fit(X_train, y_train)

print(trainedmodel)

predictions = trained_model.predict(X_test)

#Train and Test Accuracy
print("Train Accuracy :: ", accuracy_score(y_train,
trained_model.predict(Xtrain))) print("Test Accuracy :: ",
accuracy_score(y_test, predictions))
print('Confusion matrix ", confusion_matrix(y_test,
predictions))
```

1110

INTEGRATION OPTIMIZATION USING MACHINE LEARNING ALGORITHMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to the optimization of integration and process flows in connection with application development.

BACKGROUND

Integration and process flows are a critical aspect of enterprise application development. The integration and process flows typically include various integration patterns, and messaging, flow and communication mechanisms. A poorly designed integration and process flow adversely impacts application development and time to market, negatively impacts runtime performance of the application, and may result in duplicate messages and/or message loss. Identifying and correcting issues with and validating integration and process flows early in the application development cycle accelerates the time to market, reduces performance errors in production, improves message quality and improves durability of an application.

Enterprise subject-matter experts (SMEs) experience challenges during application development when the development process involves products from several outside vendors, internally developed systems and/or legacy proprietary products aimed at supporting a specific vendor's subset of technology.

SUMMARY

Illustrative embodiments provide techniques for utilizing machine learning to syntactically and semantically validate integration and integration process components in connection with the design and development of applications and to predict runtime outcomes for the applications.

In one embodiment, a method comprises receiving configuration data comprising a plurality of parameters of at least one computing environment. One or more of the parameters correspond to integration of one or more elements of the at least one computing environment with one or more other elements at least one of within and external to the at least one computing environment. In the method, the parameters are analyzed to detect one or more anomalies in the configuration data, and the configuration data and the one or more detected anomalies are inputted to one or more machine learning models. The method also comprises determining, using the one or more machine learning models, one or more modifications to at least one of the plurality of parameters based on the inputted configuration data and one or more detected anomalies, and transmitting the determination comprising the one or more modifications to a user over a communications network.

These and other illustrative embodiments include, without limitation, methods, apparatus, networks, systems and processor-readable storage media.

BRIEF DESCRIPTION OF THE DRAWINGS

FIG. 6 illustrates a table comprising resource naming formats that may result in errors and remedial recommendations according to an illustrative embodiment.

FIG. 7 illustrates a table comprising connector types that may result in errors and remedial recommendations according to an illustrative embodiment.

FIG. 8 illustrates a table comprising an example of a dynamic process property anomaly and a remedial recommendation according to an illustrative embodiment.

FIG. 9 depicts example process error logs used in connection with training machine learning models for evaluating and recommending component configurations according to an illustrative embodiment.

FIGS. 11A and 11B depict example pseudocode used in connection with training and execution of machine learning models in a machine learning engine according to illustrative embodiments.

DETAILED DESCRIPTION

Figure 1:
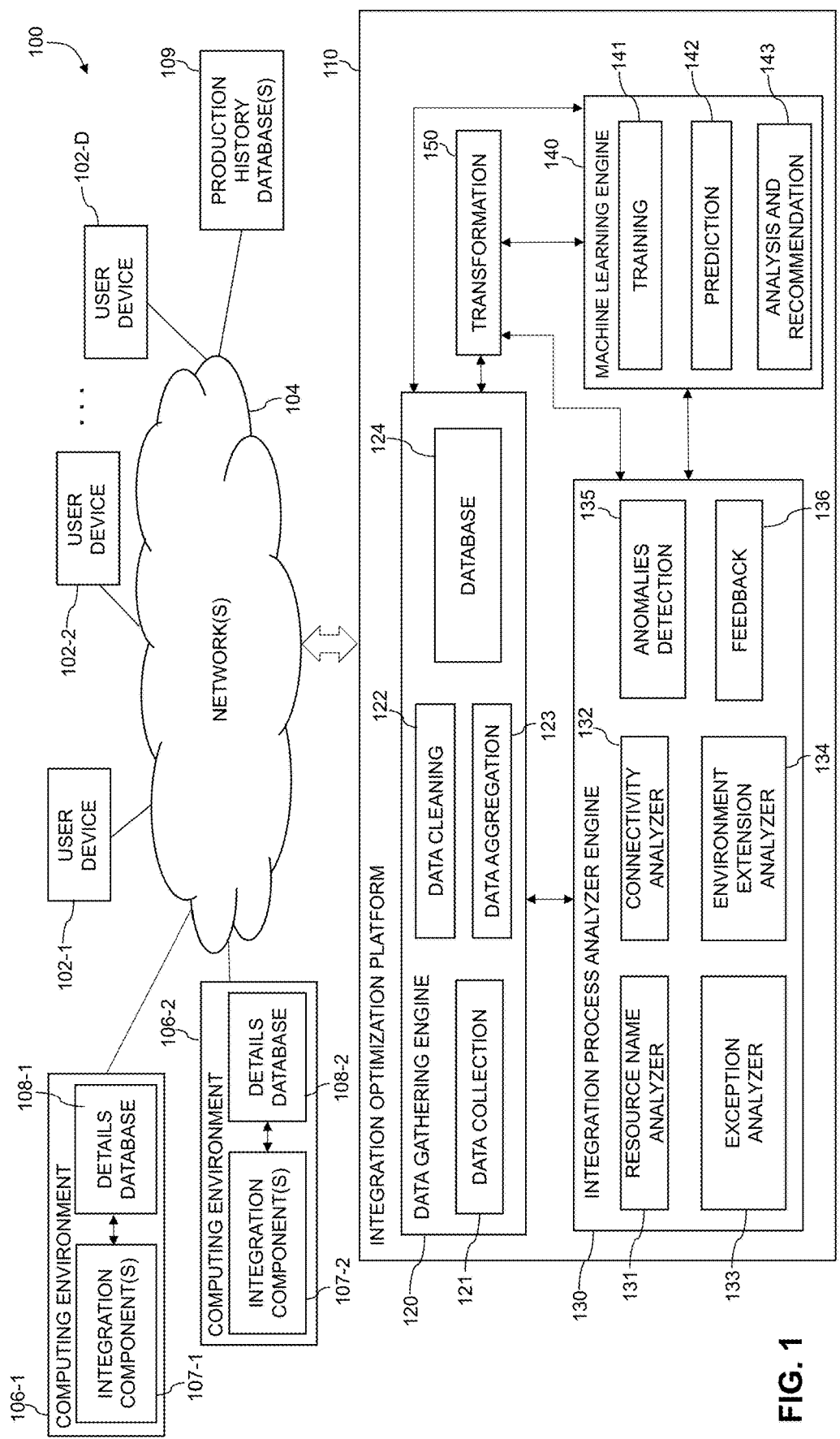
FIG. 1 depicts details of an information processing system with an integration optimization platform for automatically evaluating and recommending component configurations in computing environments according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, a "component," "integration component" or "integration process component" is to be broadly construed, and can refer to various parts, hardware components and/or software components for providing, for example, application integration, data quality governance, business-to-business/electronic data interchange ("B2B/EDI"), network or other communication management, application programming interface ("API") management, workflow automation, message management or other functionality to facilitate integration of elements within a computing environment or between computing environments. In a non-limiting example, "elements" of a computing environment are to be broadly construed, and can refer to, but are not necessarily limited to, applications, systems (e.g., storage and messaging systems), user devices, servers and other hardware devices, or other computing environment resources. For example, an integration component comprises a unified platform that facilitates the flow of data across computing environment elements.

As used herein, terms such as "optimize" and "optimization" encompass an improvement relative to an arrangement that might otherwise result without using the disclosed techniques, but the terms "optimize" and "optimization" should not be construed as requiring any particular maximum or minimum performance levels.

Illustrative embodiments use one or more machine learning techniques to provide real-time best practice recommendations for integration and processing associated with application design and development. In an illustrative embodiment, an integration optimization platform compatible with multiple programming languages and environments uses machine learning techniques to compare predicted integration component configuration parameters with customer provided configuration parameters to recommend an optimized integration and process flow for application development. Using the machine learning techniques, the optimized integration and process flow is regularly fine-tuned to minimize any downtime during the development process.

According to an embodiment, all programming language (e.g., Java®) methods or classes are generically built from existing methods and/or classes to create generic methods and/or classes applicable to multiple types of platforms. The generic methods and/or classes can be used as plug-in extensions so that enterprise integrator products from multiple sources can easily utilize the integration optimization platform.

FIG. 1 shows an information processing system 100 configured in accordance with an illustrative embodiment. The information processing system 100 comprises user devices 102-1, 102-2, . . . 102-D (collectively "user devices 102"). The user devices 102 communicate over a network 104 with an integration optimization platform 110.

The user devices 102 can comprise, for example, Internet of Things (IoT) devices, desktop, laptop or tablet computers, mobile telephones, or other types of processing devices capable of communicating with the integration optimization platform 110 and each other over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable D and other similar index variables herein such as L and P are assumed to be arbitrary positive integers greater than or equal to two.

The terms "client", "customer" or "user" herein are intended to be broadly construed so as to encompass numerous arrangements of human, hardware, software or firmware entities, as well as combinations of such entities. Integration optimization services may be provided for users utilizing one or more machine learning models, although it is to be appreciated that other types of infrastructure arrangements could be used. At least a portion of the available services and functionalities provided by the integration optimization platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the integration optimization platform 110, as well as to support communication between the integration optimization platform 110 and connected devices (e.g., user devices 102) and/or other related systems and devices not explicitly shown.

Users may refer to customers, clients and/or administrators of computing environments for which integration component configurations are evaluated and recommended. For example, in some embodiments, the user devices 102 are assumed to be associated with repair technicians, system administrators, information technology (IT) managers, software developers, release management personnel, or other authorized personnel configured to access and utilize the integration optimization platform 110. For example, as explained further herein, during development of an integration flow, a user, via one of the user devices 102, initiates a request to the integration optimization platform 110 to evaluate integration component parameters to determine whether the provided parameters will result in an integration solution that minimizes runtime errors and maximizes message quality of service and durability of integrated applications.

The information processing system 100 further includes computing environment 106-1 and computing environment 106-2 (collectively "computing environments 106") connected to the user devices 102 and to the integration optimization platform 110 via the network 104. The computing environments 106 comprise for example, integration components 107-1 and 107-2 (collectively "integration components 107"). The integration optimization platform 110 generates integration optimizations for the computing environments 106 for users such as, for example, integration administrators, so that the users can perform or commence performance of remedial measures to address and/or fix integration component problems predicted by the integration optimization platform 110, or the system 100 may automatically perform or commence performance of remedial measures, such as, for example, modifying integration component parameters based on predicted runtime outcomes made by the integration optimization platform 110. A non-limiting example of a computing environment 106 for which the integration optimization platform 110 is configured to generate integration optimizations is a data center. However, the integration optimization platform 110 can generate integration optimizations for any computing environment or combination of computing environments comprising multiple elements, which may be connected to each other over one or more networks and/or other types of connections. Moreover, although two computing environments 106-1 and 106-2 are shown, the embodiments are not necessarily limited thereto, and more or less computing environments 106 may be part of the information processing system 100.

The computing environments 106 further each include a details database 108-1 and 108-2 (collectively "details databases 108"). The details databases 108 comprise integration component configuration details such as, but not necessarily limited to, integration process code, exception parameters, heap/stack memory utilization parameters, environment extension parameters, resource naming parameters and connectivity parameters. The connectivity parameters comprise, for example, connector types used in processes and connection parameters to connect two or more processes or other computing environment elements. The exception parameters comprise, for example, try and/or catch parameters, such as a try/catch shape parameter and/or a check connection catch parameter. The try and catch statements are associated with Java® code. In more detail, try statements are used to define blocks of code to be tested for errors during execution, and catch statements are used to define blocks of code to be executed when errors occur in try code blocks. The embodiments of the invention are not limited to Java® code, and may include similar parameters for code developed for other platforms.

The details databases 108 further include additional integration component configuration details such as, but not necessarily limited to, parameters corresponding to monitoring and reporting statuses of computing environments. The parameters may specify the data that would be retrieved by the monitoring, and included as part of reports, as well as code for executing the monitoring and retrieval. The retrieved data may include, for example, performance metrics such as, but not necessarily limited to, throughput, latency, memory capacity and usage, response and completion time, channel capacity and bandwidth, which may be collected via logs, sensors or other equipment or software associated with the integration components 107.

The information processing system 100 further includes one or more production history databases 109 connected to the network 104. According to one or more embodiments, the production history databases 109 include historical data with runtime performance metrics associated with previously executed integration processes in multiple computing environments. Similar to the performance metrics noted above in connection with status monitoring and reporting, such performance metrics can include, but are not necessarily limited to, throughput, latency, memory capacity and usage, response and completion time, channel capacity and bandwidth, which may be collected via logs, sensors or other equipment or software. As explained further herein, the production history data from the production history databases 109 is used to train one or more machine learning models used in connection with predicting whether provided integration component parameters will result in runtime errors, alerts or other issues in an integration process.

Referring to FIG. 9, the production history data comprises process error logs, which may be the same or similar to the error log 900. The error log 900 can include details such as, for example, the date and time of the event, the level of severity (e.g., warning, severe), the nature of the task (e.g., decision shape logic, return results, messaging, process execution, etc.), and the returned error. According to an embodiment, a decision shape requires the comparison of two or more values such as, for example, numerical values, document values, database values, query results, etc. Based on a result of the comparison a decision is made to proceed with a process in a certain manner depending on the parameters of the decision shape. As can be seen in the error log 900, in some instances, there may be a problem with the decision shape, and an error message is returned. In connection with a task that requires returning of results, results may fail to be returned for certain execution tasks and/or when exceptions are out of bounds. There can also be problems with message handling, where messages in a queue fail to send or are not received. As further shown in the error log 900, processes may fail to execute and time out when elements specified in parameters do not exist.

Figure 10:
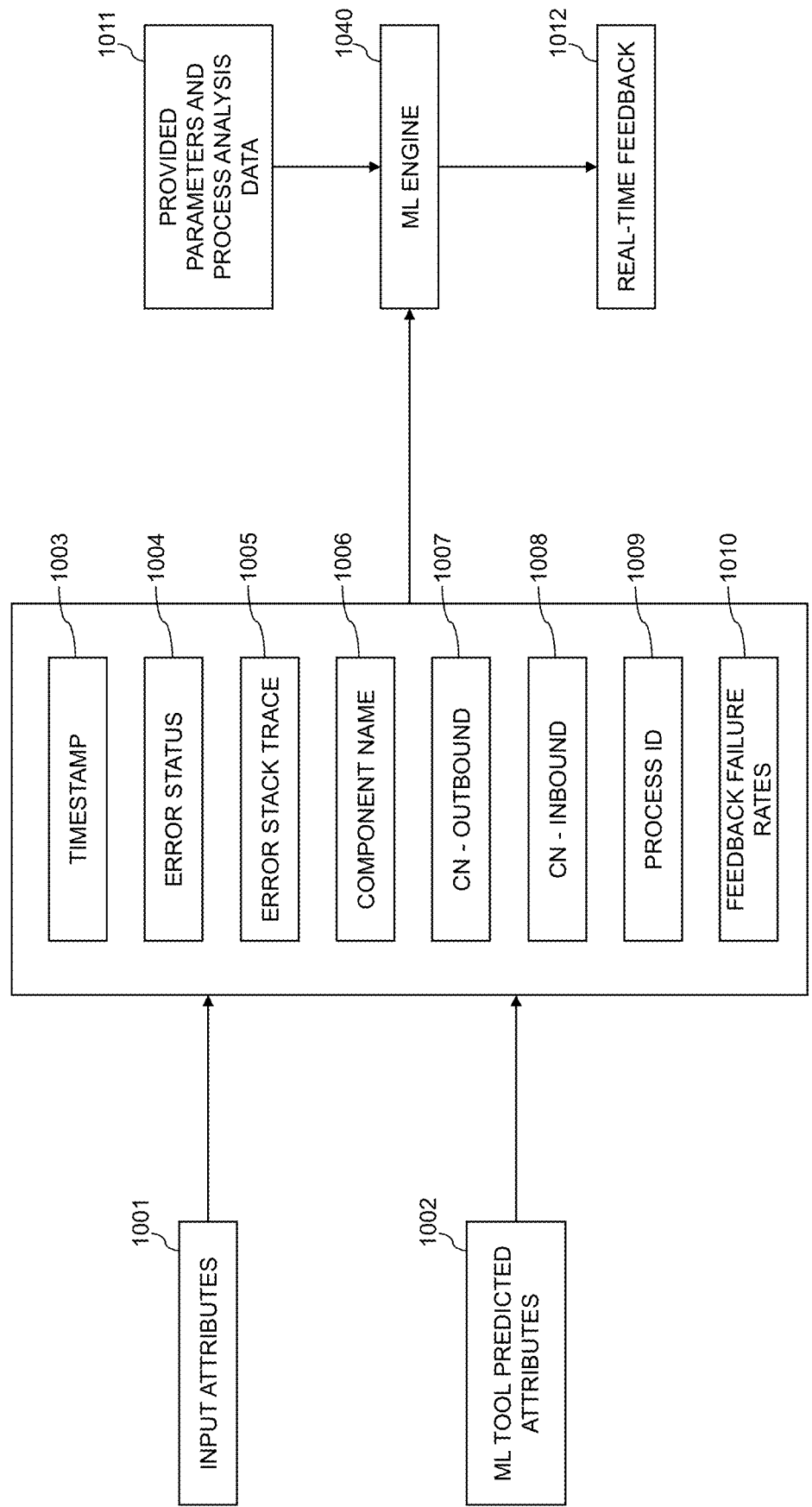
FIG. 10 depicts attributes used in connection with training a machine learning model comprising an ensemble-bagging algorithm according to an illustrative embodiment.

Referring to FIG. 10, attributes of production history data used in connection with training a machine learning model comprise, for example, inputted attributes 1001 (i.e., attributes specified and supplied by a user) and/or attributes 1002, which are automatically determined by a machine learning (ML) tool to be suitable to be used for training the machine learning model. The attributes which may be relevant to training the machine learning model include, but are not necessarily limited to, error log timestamp 1003 (e.g., date and/or time), error status 1004, error stack trace 1005 providing a location in a program where an error occurs, component name 1006, outbound component name (CN) 1007, inbound component name 1008, a process identifier (ID) 1009 and feedback failure rates 1010. As shown in FIG.

10, and as will be explained in more detail in connection with FIG. 1, the attributes 1003-1010 are provided to a machine learning engine 1040 to train one or more machine learning models used in connection with predicting whether provided integration component parameters will result in runtime errors, alerts or other issues in an integration process. As described in more detail herein, user provided integration component parameters and integration process analysis data 1011 are provided to the machine learning engine 1040, and the one or more trained machine learning models are used to compare predicted integration component configuration parameters with the provided configuration parameters to recommend an optimized integration and process flow for application development. Modifications to provided parameters recommended by the machine learning engine 1040 are provided as real-time feedback 1012 to a user requesting analysis of an integration flow and integration component parameters.

According to one or more embodiments, the production history data is retrieved by a module that captures, indexes and correlates the data in the production history databases 109. The production history database 109 may be searchable. The production history data may be retrieved from a plurality of operational computing environments running integration processes, whereby the module searches, monitors and analyzes integration flow data and metrics from the computing environments.

The integration optimization platform 110 in the present embodiment is assumed to be accessible to the user devices 102, and vice versa, over the network 104. In addition, the integration optimization platform 110 and the user devices 102 can access the computing environments 106 and the production history databases 109 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The integration optimization platform 110, on behalf of respective infrastructure tenants each corresponding to one or more users associated with respective ones of the user devices 102 provides a platform for automatically evaluating and recommending component configurations in the computing environments 106.

Referring to FIG. 1, the integration optimization platform 110 comprises a data gathering engine 120, an integration process analyzer engine 130, a machine learning engine 140 and a transformation engine 150. The data gathering engine 120 includes a data collection layer 121, a data cleaning layer 122, a data aggregation layer 123 and a database 124. The integration process analyzer engine 130 includes a resource name analyzer 131, a connectivity analyzer 132, an exception analyzer 133, an environment extension analyzer 134, an anomalies detection layer 135 and a feedback layer 136. The machine learning engine 140 includes a training layer 141, a prediction layer 142 and an analysis and recommendation layer 143.

Referring to the system 100 in FIG. 1, according to one or more embodiments, the data collection layer 121 of the data gathering engine 120 collects the integration component configuration details (as described herein above) from the details databases 108 of the computing environments 106. In addition, the data collection layer 121 of the data gathering engine 120 collects the production history data (as described herein above) from the production history databases 109. The data cleaning layer 122 detects and corrects or removes problematic data, which may be corrupt, inaccurate, incomplete, incorrect or irrelevant.

The data aggregation layer 123 compiles the data from the details and production history databases 108 and 109 to generate combined datasets that can be processed by the integration process analyzer engine 130 and machine learning engine 140. For example, the data aggregation layer 123 filters the data and tags and/or classifies the data into different categories, such as, but not necessarily limited to, resource names, connector types or other connector details, exceptions (e.g., try/catch), connection parameters and/or process properties for extensions.

The collected data may be stored in one or more databases 124. In an embodiment, the data collection layer 121 is integrated with the integration components 107 of the computing environments 106. The data collection layer 121 may have access to the integration components 107, details databases 108 and production history databases 109 using one or more API protocols such as, for example, Redfish® representational state transfer (REST) protocol.

The collected data from the data gathering engine 120 is input to the integration process analyzer engine 130 and machine learning engine 140. In addition, the collected data from the data gathering engine 120 may be input to the transformation engine 150 which can reconfigure parameters from a configuration corresponding to a source operating system to a configuration corresponding to a target operating system, wherein the target operating system utilizes different protocols and/or code than the source operating system. The integration optimization platform 110, via the transformation engine 150, is equipped to analyze integration flows designed for or on one operating system that may need to run on another different operating system. The transformation engine 150 is configured with different APIs and knowledge bases to convert code into different formats to provide a technology agnostic integration optimization platform 110 which provides users with recommended parameters for integration components that may have been originated for or on a particular source operating system, and are being implemented on a different target operating system. The transformation engine 150 is individually accessible by the data gathering engine 120, integration process analyzer engine 130 and the machine learning engine 140 at various points during processing when needed to adapt parameters and/or code to different operating systems.

Figure 3:
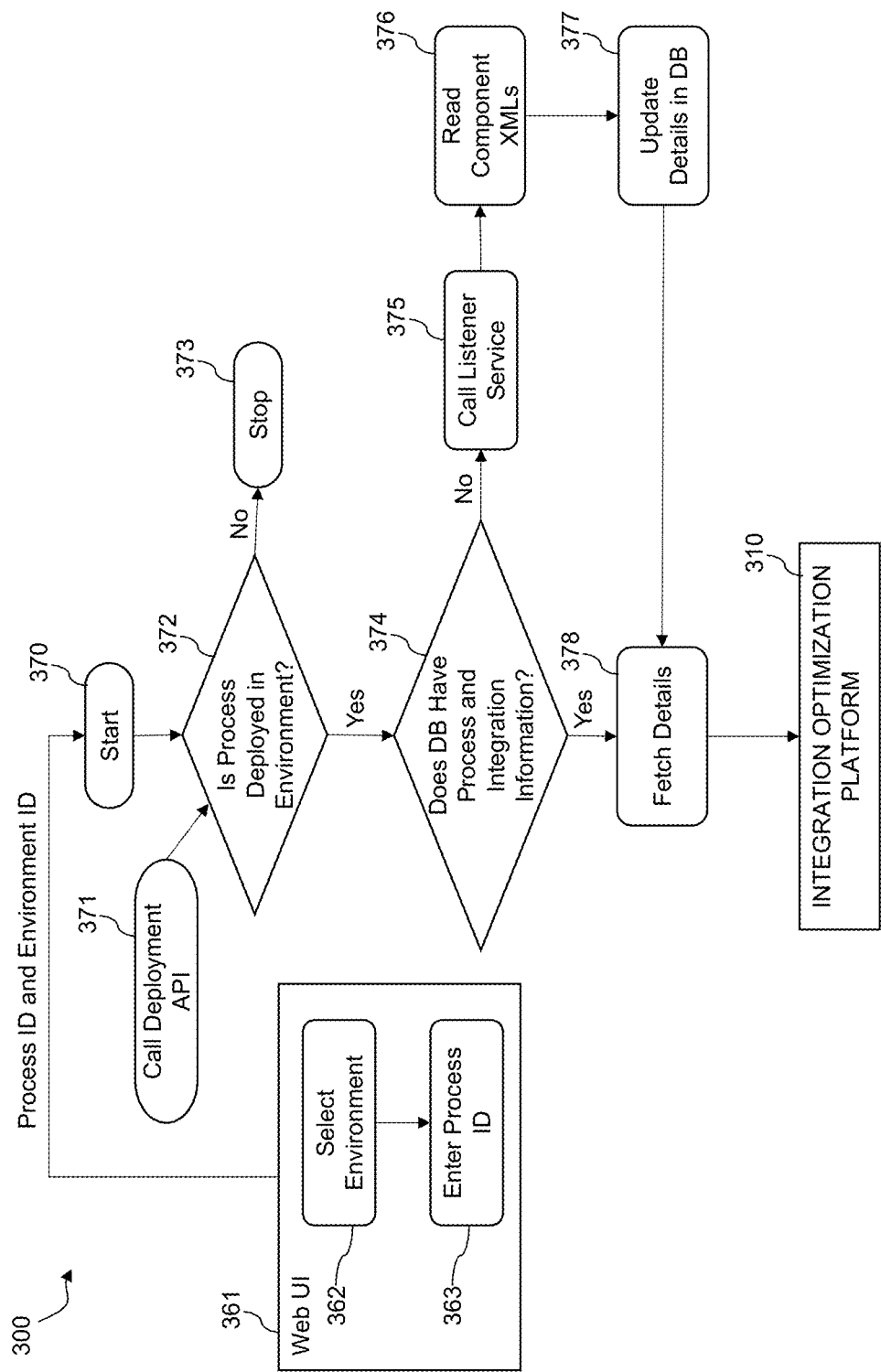
FIG. 3 depicts details of an operational flow for providing process details to an integration optimization platform according to an illustrative embodiment.
Figure 4:
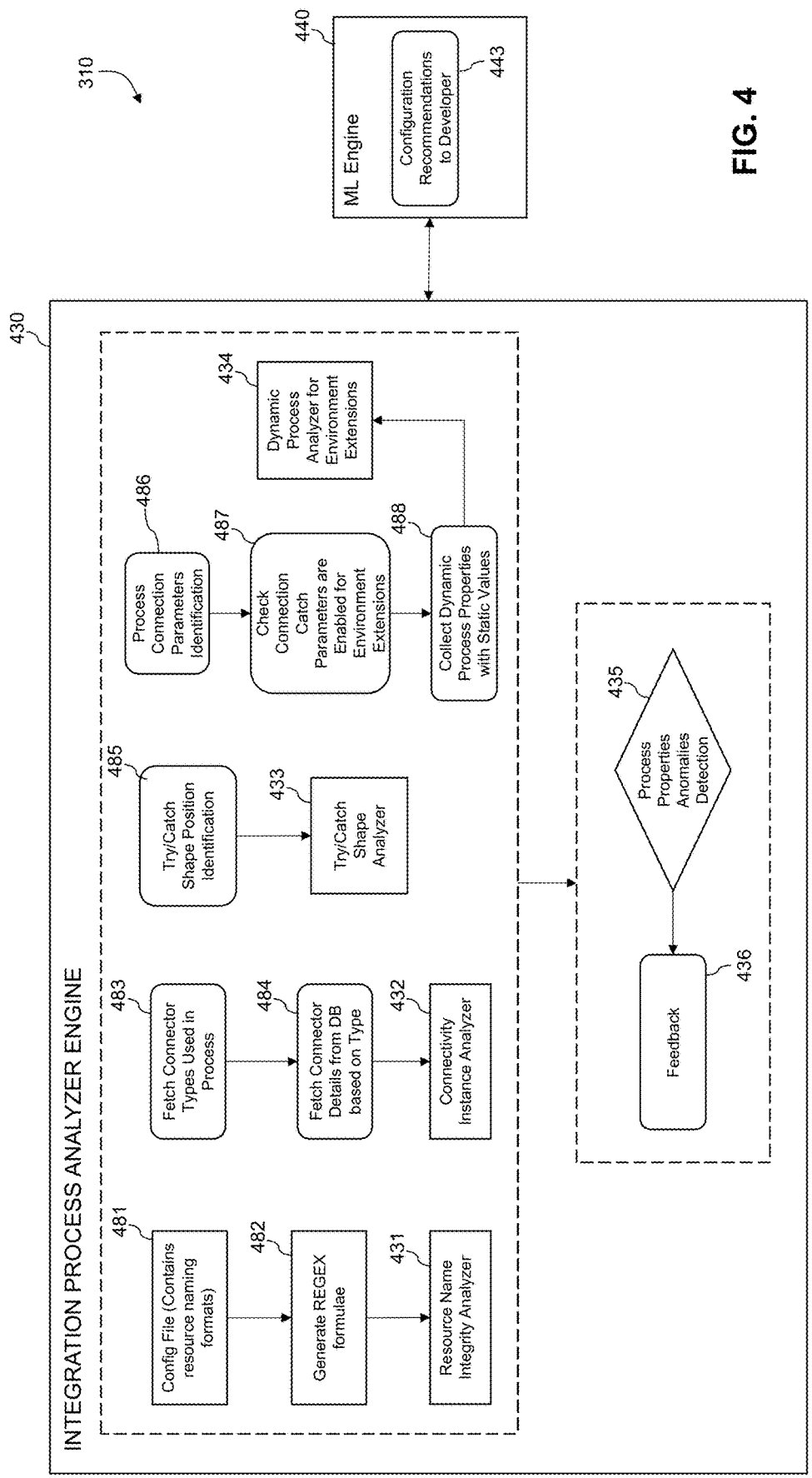
FIG. 4 depicts functional details of integration process analyzer and machine learning engines of an integration optimization platform according to an illustrative embodiment.

Referring to FIGS. 1, 3 and 4, a user requesting an evaluation of an integration process by the integration optimization platform 110, accesses a user interface (UI), such as, for example, web UI 361 via one of the user devices 102. In the operational flow 300 in FIG. 3, the web UI 361 includes, for example, an option to select an environment 362 and to enter a process identifier (ID) 363. The environment refers to, for example, an operating system, device, group of devices and/or platform on which a particular integration process identified by the process ID 363 would be deployed. An environment may refer to one or more of the computing environments 106. In connection with evaluating an integration process prior to implementing the process for clients, an administrative user for an enterprise may deploy the process in a test environment. In this example, the environment can refer to a test environment used for testing and modifying integration components (e.g., integration components 107) prior to their availability to clients. However, the embodiments are not necessarily limited thereto, and the integration optimization platform 110 can also be used to evaluate integration processes that are already being operated for clients, and may require modification due to problems with the integration flows.

Process and environment IDs are received (block 370) and a deployment API is called (block 371) in connection with determining whether the process identified by the process ID is deployed in the environment identified by the environment ID (block 372). If the process is not deployed in the environment, and cannot be evaluated, then the operational flow 300 is ended (block 373). If the process is deployed in the environment, then it is determined whether a database (DB) (e.g., details database 108) includes the configuration details for the process and integration information (block 374). If the database comprises the process details, the details are retrieved (e.g., by the data collection layer 121) (block 378) and input to the integration optimization platform 310. The process deployment date is also retrieved from the database. The retrieved process details are converted into a process object.

If at, block 374, the database is determined not to have the process details, a listener service is called (block 375), component XML data pertaining to the process details for the integration components (e.g., integration components 107) is read (block 376) and the process details gathered from the XML data are updated in the database (e.g., details database 108) (block 377). The updated process details are retrieved (block 378) and input to the integration optimization platform 310. For example, upon calling the listener service, a zip file is extracted and XML files are read using a parser such as, for example, a SAX (Simple API for XML) parser, and component information is stored in a process object.

Referring to FIGS. 1 and 4, upon receiving the collected process details from the data gathering engine 120, the integration process analyzer engine 130/430 of the integration optimization platform 110/310 analyzes the integration process parameters to detect anomalies in the process (block 435) and provide feedback to user regarding the detected anomalies (block 436). The anomalies are detected by an anomalies detection layer 135 based on input from a resource name analyzer 131, a connectivity analyzer 132, an exception analyzer 133 and an environment extension analyzer 134. More specifically, as shown in FIG. 4, the process details comprise configuration files including resource naming formats 481, from which regular expression (REGEX) formulae are generated (block 482) based on resource type and processed by a resource name integrity analyzer 431 to determine whether there any problems associated with resource names that may result in errors when running integration processes. REGEX formulae are used, for example, in Java® to determine patterns in a string. Referring to FIG. 6, a table 600 illustrates resource naming formats that may result in errors and recommended valid resource names for the erroneous formats.

The process details also comprise connector types used in an integration process and connector details based on type, which are retrieved from the details databases 108 (blocks 483 and 484), and analyzed in a connectivity instance analyzer 432 to determine whether there are any problems associated with connectors that may result in errors when used in integration processes. The connectivity instance analyzer 432 further compares relevant connector details from the details databases 108 to a compiled list of process connectors to determine duplicate connectors. Referring to FIG. 7, a table 700 illustrates connector types that may result in errors and a recommendation for modifying the erroneous connector type. In table 700, duplicate connectors are detected, and the recommendation is to reuse existing connectors to save license costs and to achieve better code maintenance.

The process details further comprise statements for initiating and executing evaluation of exceptions such as, but not necessarily limited to "try" statements used for defining blocks of code to be tested for errors while the code is being executed, and "catch" statements used for defining a block of code to be executed when errors occur in try blocks. Try/Catch shapes in a process can be used to catch document- and/or process-level errors. The integration process analyzer engine 130/430 identifies try/catch shape positions (block 485) to determine their functionality based on the locations of the try/catch shapes in a process. A try/catch shape analyzer 433 determines the types of errors being analyzed in connection with identified try and catch expressions. The try/catch shape analyzer 433 performs shape validation comprising validation of exception handling, branch closure, dynamic process properties and dynamic document properties.

According to one or more embodiments, the integration process analyzer engine 130/430 identifies connection parameters used in processes (block 486), enables "check connection" catch parameters for environment extensions (block 487) and collects dynamic process properties having static values (block 488). A dynamic process analyzer 434 analyzes environment extensions used in integration processes. Referring to FIG. 8, a table 800 illustrates an example of a dynamic process property anomaly and recommendation to remedy to the anomaly. More specifically, table 800 refers to a scenario where a dynamic process property is not enabled for an environment extension, leading to a code change in another environment. In order to avoid the code change, the recommendation is to enable the dynamic process property for environment extensions.

The resource name analyzer 131, connectivity analyzer 132, exception analyzer 133 and environment extension analyzer 134 in the integration process analyzer engine 130 of FIG. 1 may include the functionality described in connection with the resource name integrity analyzer 431, connectivity instance analyzer 432, try/catch shape analyzer 433 and dynamic process analyzer 434 of FIG. 4, as well as additional functionality.

Figure 12:
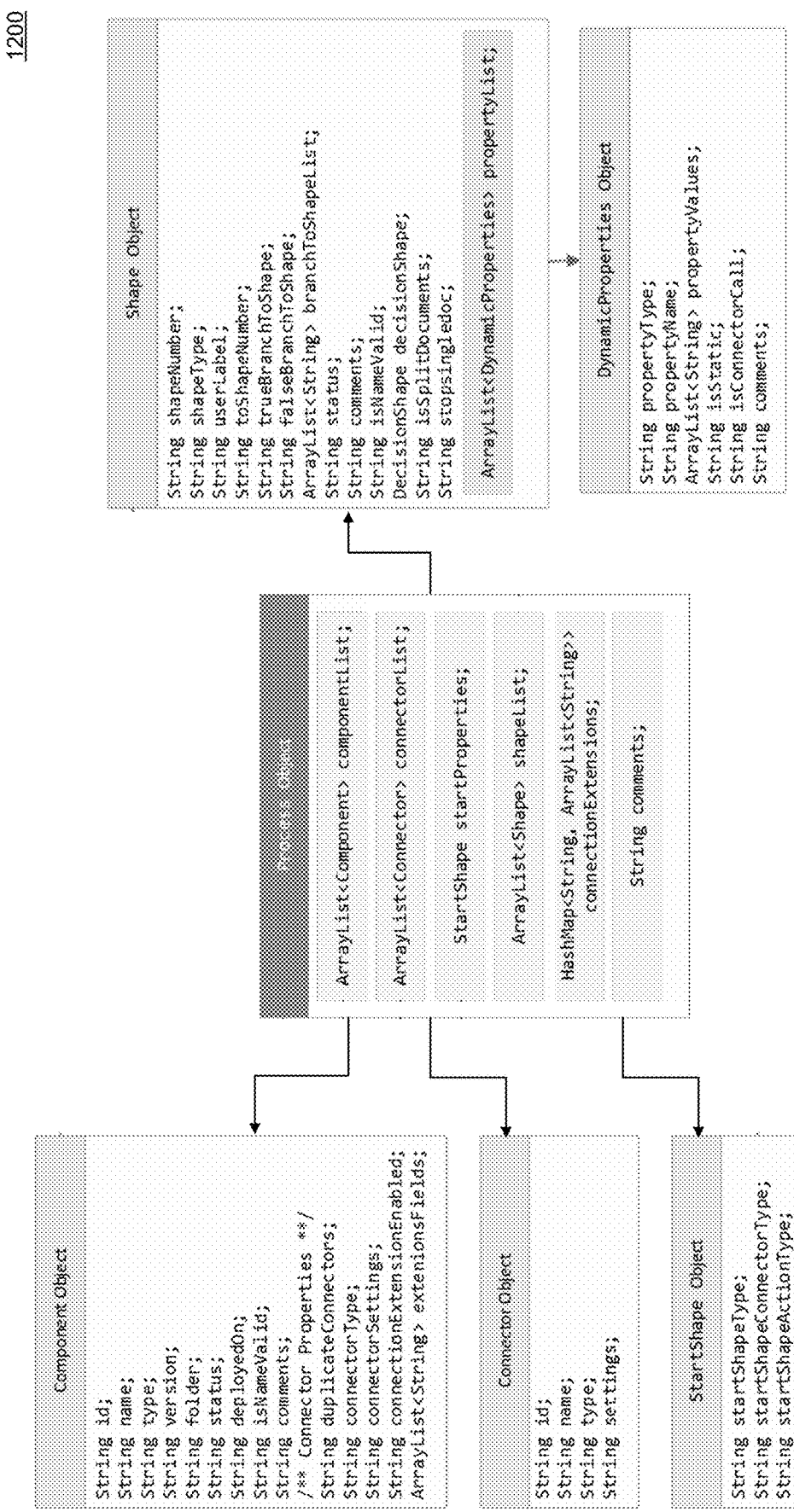
FIGS. 12 and 13 depict example class diagrams for integration and integration process components used in connection with implementing evaluation and recommendation of component configurations according to illustrative embodiments.
Figure 13:
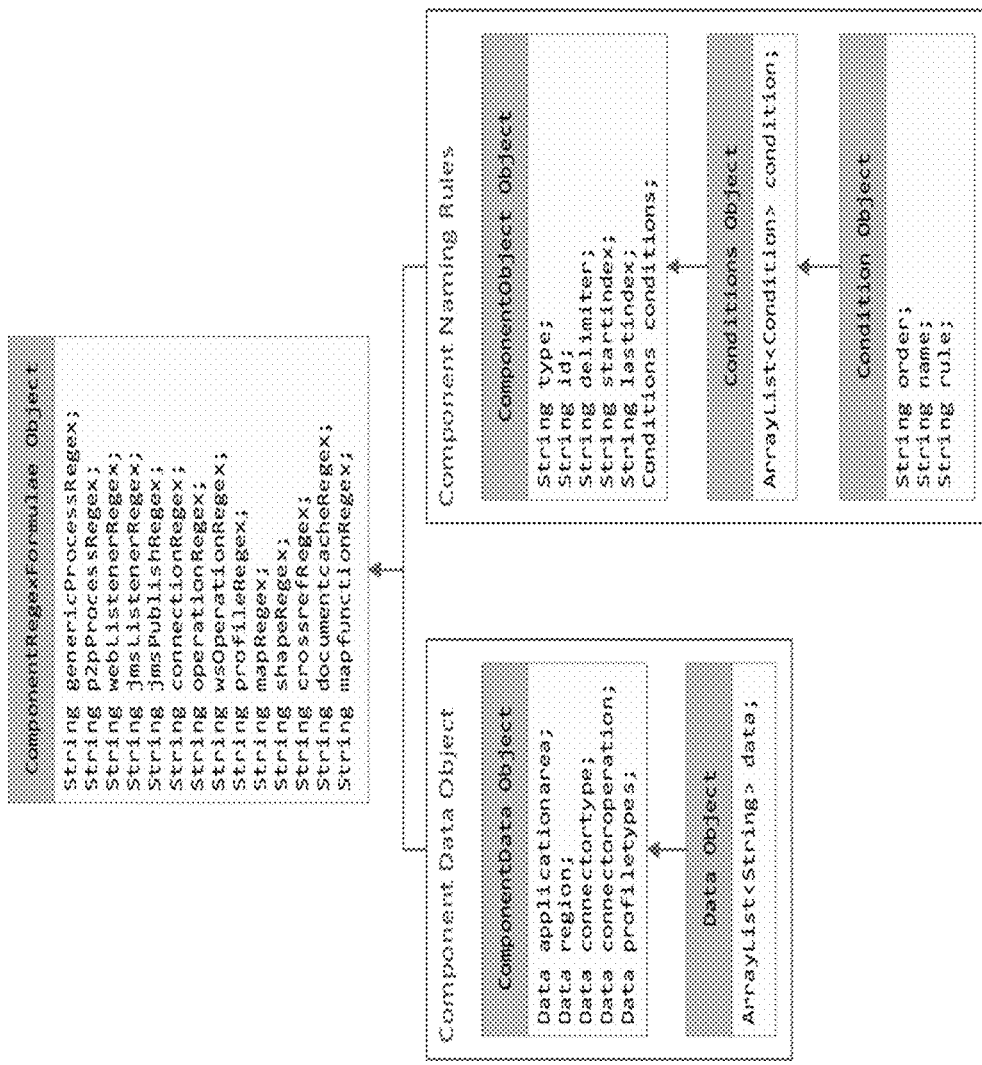

Referring to FIGS. 12 and 13, example class diagrams 1200 and 1300 for integration and integration process components used in connection with implementing evaluation and recommendation of component configurations are shown. For example, in connection with FIGS. 12 and 13, "class" refers to a defined set of properties common to all objects of one type and from which the objects can be created. A class can include templates that are used to create objects, and to define object data types and methods. For example, in some cases, classes correspond to categories, and objects correspond to the items within each category.

One or more embodiments may be implemented with several Java® classes, but the embodiments are not necessarily limited to Java® implementations, and other programming languages may be used.

The class diagram 1200 in FIG. 12 includes Component, Connector, StartShape, Process, Shape, and DynamicProperties objects. The class diagram 1300 in FIG. 13 includes ComponentRegexFormulae object, which includes Component Data Object including ComponentData and Data objects, and Component Naming Rules including ComponentObject, Conditions, and Condition objects.

Referring to block 435 in FIG. 4, similar to the anomalies detection layer 135, anomalies in the process details are detected based on input from the resource name integrity analyzer 431, connectivity instance analyzer 432, try/catch shape analyzer 433 and dynamic process analyzer 434. As described herein, the process details include integration component configuration data comprising a plurality of parameters such as, but not necessarily limited to, resource naming parameters, connectivity parameters, exception parameters and extension parameters. Referring to FIGS. 1 and 4, a feedback layer 136 provides the detected anomalies to users via one or more user devices.

The process details from the details databases 108, the analysis results from the analyzers 131/431, 132/432, 133/433 and 134/434 and the detected anomalies from the anomalies detection layer/block 135/435 are provided to the machine learning engine 140/440. The machine learning engine 140/440 uses one or more machine learning models to analyze and predict the probability of success and failure of integration components at runtime, and to recommend modifications to parameters determined to cause runtime errors based on the analysis. According to one or more embodiments, the one or more machine learning models comprise a random forest classifier which is an ensemble-bagging algorithm. The random forest classifier uses a large group of complex decision trees to provide predictions with a high degree of accuracy based of different amounts of training data. A training layer 141 uses data from the production history databases 109 comprising, for example, runtime metrics including information logs, alerts and errors to train the machine learning models. The prediction layer 142 uses the machine learning models to analyze and predict the probability of success and failure of integration components at runtime, and the analysis and recommendation layer 143 uses the machine learning models to recommend modifications to parameters determined to cause the runtime errors. For example, based on the outcomes of configurations of the integration components in the historical training data (e.g., successful execution or failures during runtime), the machine learning model can accurately predict the outcome of an integration component having inputted parameters. The analysis and recommendation layer 143 is configured to identify particular elements of integration components which will be more likely to fail than other elements. Users, which may be, for example, part of a development team can make the necessary updates to the integration components based on recommendations from the machine learning engine 140/440, and resubmit the integration process for analysis by the integration optimization platform 110 until the integration process for a given integration is optimized.

Figure 2:
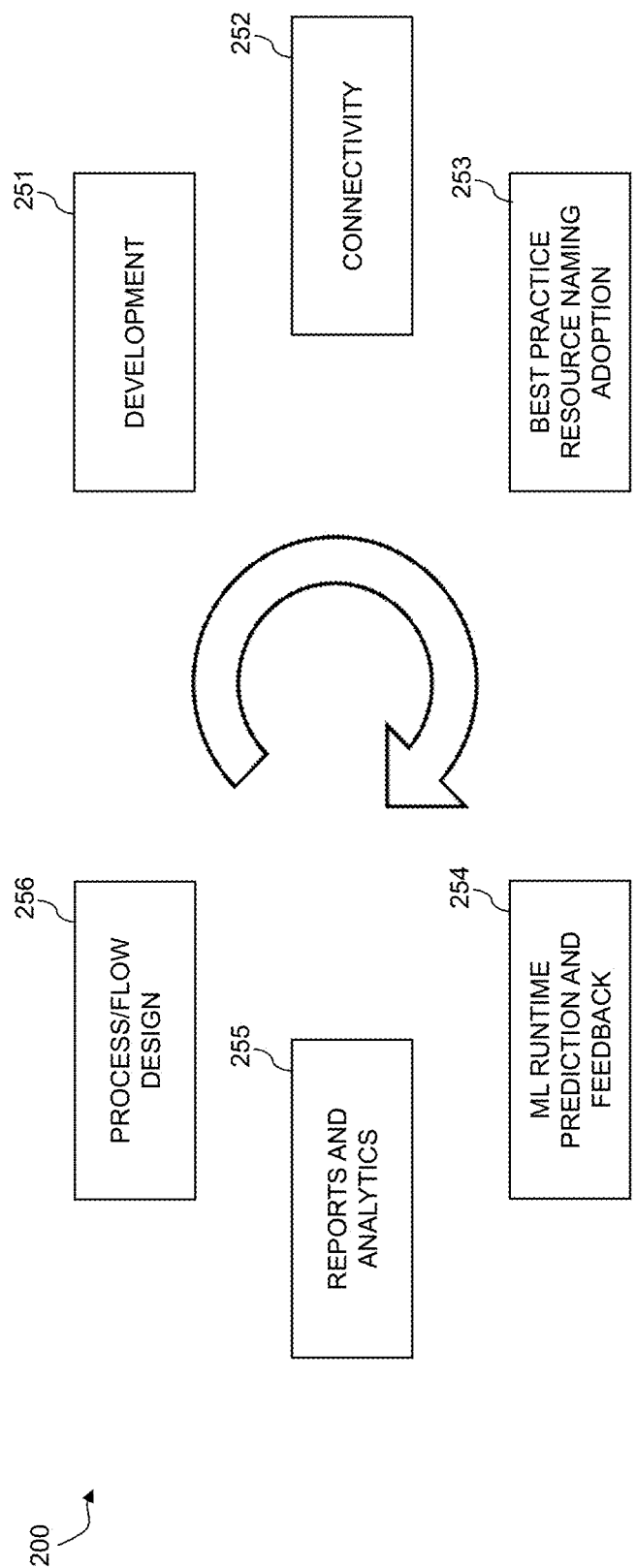
FIG. 2 depicts details of functional features of an integration optimization platform according to an illustrative embodiment.

Referring to FIG. 2, details of example functional features 200 of an integration optimization platform are shown. For example, as per development block 251, the integration optimization platform 110/310 integrates best practice coding principles in flow exception handling, unreachable code, branches, environment extensions, and heap/stack memory utilization and efficiency. As per connectivity block 252, the integration optimization platform 110/310 optimizes real-time source-target connector instance utilization, which provides for more efficient code, and may reduce connector licensing costs. As per the best practice resource naming adoption block 253, the integration optimization platform 110/310 provides process element and resource names governance based on rules and parameters from a rules knowledge base. As per the machine learning (ML) runtime prediction and feedback block 254, the integration optimization platform 110/310 proactively predicts integration component production operation status by applying machine learning models based on historical training data to user-provided configurations of integration components. Based on the analysis by the machine learning engine 140/440, feedback/loopback changes to the integration component parameters are provided to users to improve the robustness and stability of the integration components. The feedback recommendations for modifying the integration components (e.g., configuration recommendations to a developer 443 in FIG. 4) may be provided as real-time responses to users in response to requests to analyze and evaluate the user-provided integration component configurations.

As per the reports and analytics block 255, the integration optimization platform 110/310 provides to users on-demand metric and health-check decisions, and integration component status reports. As per the process/flow design block 256, the integration optimization platform 110/310 provides integration component design template recommendations based on parameters for different operating systems (e.g., source and/or target operating systems).

Figure 5:
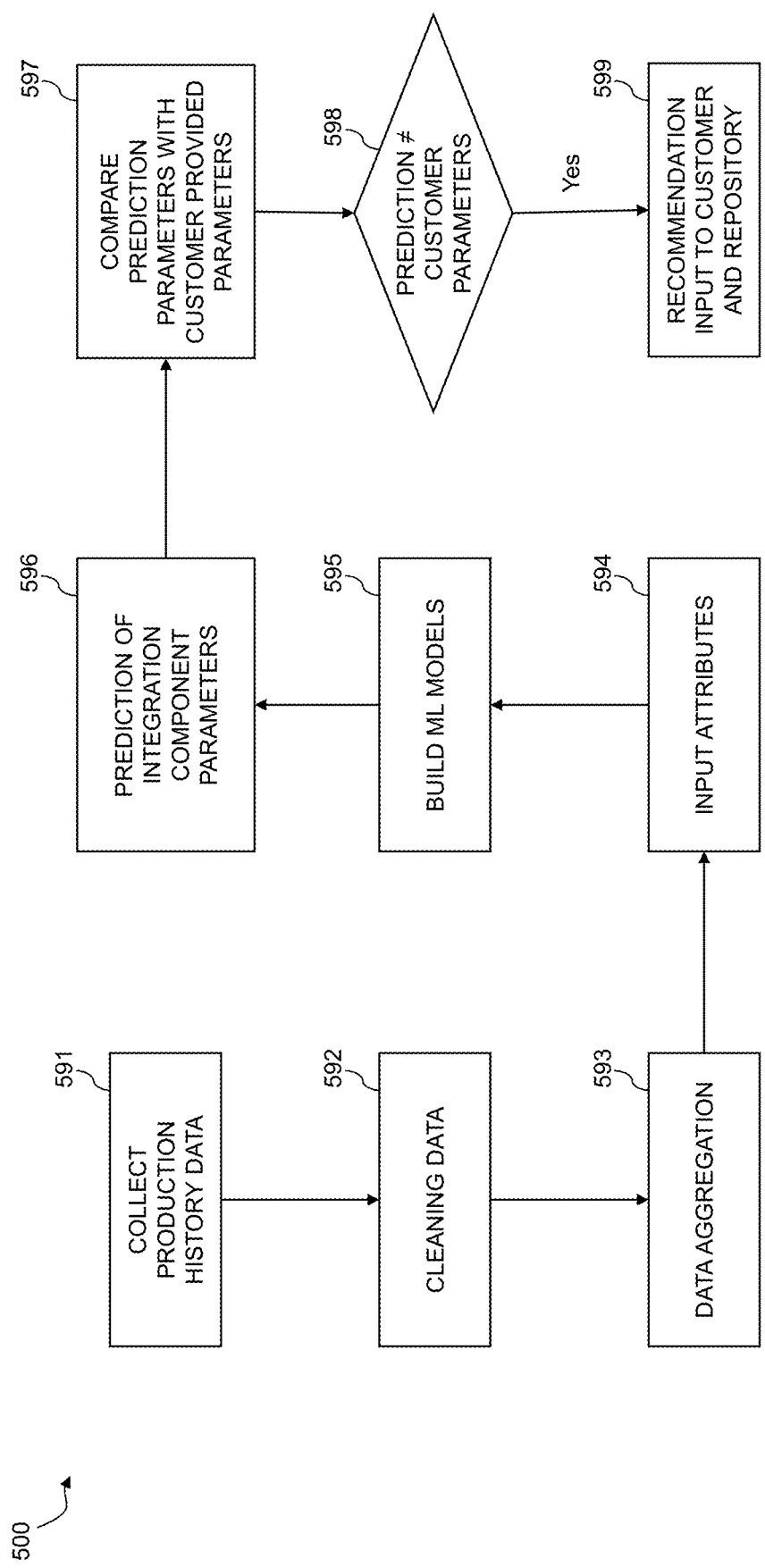
FIG. 5 depicts details of an operational flow for generating machine learning models and predicting and recommending integration component parameters according to an illustrative embodiment.

Referring to FIG. 5, details of an operational flow 500 for generating machine learning models and predicting and recommending integration component parameters are shown. At block 591, the production history data from, for example, the production history databases 109 is collected by, for example, the data collection layer 121 of the data gathering engine 120. At blocks 592 and 593, the collected data is cleaned and aggregated by, for example, the data cleaning and data aggregation layers 122 and 123 of the data gathering engine 120. As per block 594, the training data is input to the machine learning engine and the machine learning models are generated (block 595). Referring to block 596, based on the user provided configuration data comprising parameters of at least one integration component, and based on the results of the analysis of the integration process details data from the details databases 108 and of the anomalies detection by the integration process analyzer engine 130, the generated machine learning model(s) are used to predict integration component parameters. At block 597, the predicted integration component parameters are compared with the user (e.g., customer) provided integration component parameters. At block 598, it is determined whether there are any differences between the predicted integration component parameters and the user-provided integration component parameters, and the differences are identified. At block 599, a recommendation with the modified parameters based on the identified differences is transmitted to a repository and provided to a user. The processing in blocks 597, 598 and 599 can be performed by the analysis and recommendation layer 143 of the machine learning engine 140, and the processing for blocks 595 and 596 can be performed by the training and prediction layers 141 and 142, respectively, of the machine learning engine 140. Based on feedback provided from the user about the viability of the recommended modified parameters, the recommendation may be used to further train the machine learning model(s).

Referring to FIGS. 11A and 11B, example pseudocode 1105 and 1110 used in connection with training and execution of machine learning models in a machine learning engine 140/440 is shown. For example, the pseudocode 1105 refers to training random forest and decision tree classifiers, and the pseudocode 1110 refers to using the trained models to make predictions based on the received data.

According to one or more embodiments, the databases 108, 109 and 124 used herein can be configured according to a relational database management system (RDBMS) (e.g., PostgreSQL). Databases 108, 109 and 124 in some embodiments are implemented using one or more storage systems or devices associated with the integration optimization platform 110. In some embodiments, one or more of the storage systems utilized to implement the databases comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the integration optimization platform 110, the data gathering engine 120, the integration process analyzer engine 130, the machine learning engine 140 and the transformation engine 150 in other embodiments can be implemented at least in part externally to the integration optimization platform 110, for example, as stand-alone servers, sets of servers or other types of systems coupled to the network 104. For example, the data gathering engine 120, the integration process analyzer engine 130, the machine learning engine 140 and the transformation engine 150 may be provided as cloud services accessible by the integration optimization platform 110.

The data gathering engine 120, the integration process analyzer engine 130, the machine learning engine 140 and the transformation engine 150 in the FIG. 1 embodiment are each assumed to be implemented using at least one processing device. Each such processing device generally comprises at least one processor and an associated memory, and implements one or more functional modules for controlling certain features of the data gathering engine 120, the integration process analyzer engine 130, the machine learning engine 140 and/or the transformation engine 150.

At least portions of the integration optimization platform 110 and the components thereof may be implemented at least in part in the form of software that is stored in memory and executed by a processor. The integration optimization platform 110 and the components thereof comprise further hardware and software required for running the integration optimization platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data gathering engine 120, the integration process analyzer engine 130, the machine learning engine 140, the transformation engine 150 and other components of the integration optimization platform 110 in the present embodiment are shown as part of the integration optimization platform 110, at least a portion of the data gathering engine 120, the integration process analyzer engine 130, the machine learning engine 140, the transformation engine 150 and other components of the integration optimization platform 110 in other embodiments may be implemented on one or more other processing platforms that are accessible to the integration optimization platform 110 over one or more networks. Such components can each be implemented at least in part within another system element or at least in part utilizing one or more stand-alone components coupled to the network 104.

It is assumed that the integration optimization platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data gathering engine 120, the integration process analyzer engine 130, the machine learning engine 140 and other components of the integration optimization platform 110, and the elements thereof can each be implemented in the form of one or more LXCs running on one or more VMs. Other arrangements of one or more processing devices of a processing platform can be used to implement the data gathering engine 120, the integration process analyzer engine 130, the machine learning engine 140, the transformation engine 150 as well as other components of the integration optimization platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the integration optimization platform 110 to reside in different data centers. Numerous other distributed implementations of the integration optimization platform 110 are possible.

Accordingly, one or each of the data gathering engine 120, the integration process analyzer engine 130, the machine learning engine 140, the transformation engine 150 and other components of the integration optimization platform 110 can each be implemented in a distributed manner so as to comprise a plurality of distributed components implemented on respective ones of a plurality of compute nodes of the integration optimization platform 110.

It is to be appreciated that these and other features of illustrative embodiments are presented by way of example only, and should not be construed as limiting in any way.

Accordingly, different numbers, types and arrangements of system components such as the data gathering engine 120, the integration process analyzer engine 130, the machine learning engine 140, the transformation engine 150 and other components of the integration optimization platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the integration optimization platform can be offered to cloud infrastructure customers or other users as part of FaaS, CaaS and/or PaaS offerings.

Figure 14:
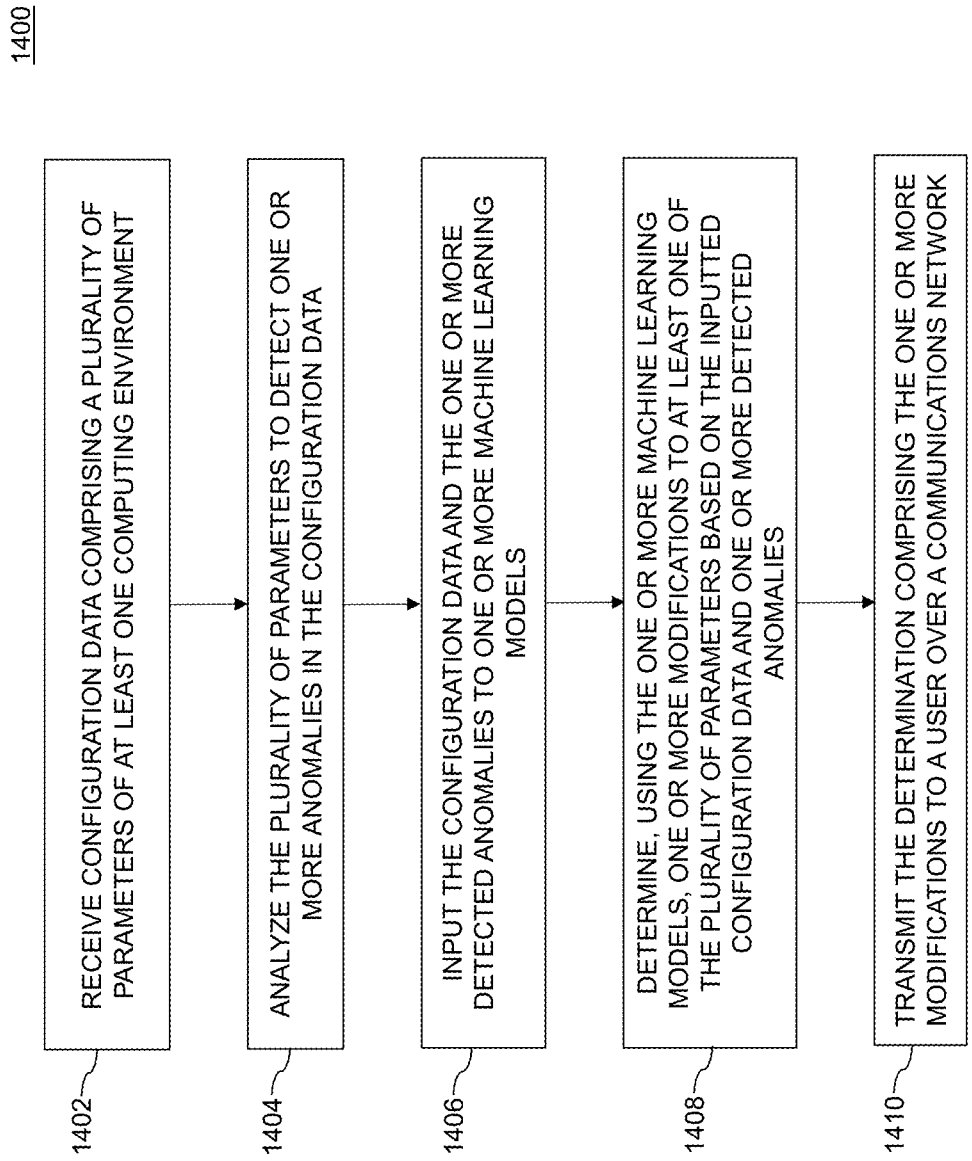
FIG. 14 depicts a process for automatically evaluating and recommending component configurations in computing environments according to an illustrative embodiment.

The operation of the information processing system 100 will now be described in further detail with reference to the flow diagram of FIG. 14. With reference to FIG. 14, a process 1400 for automatically evaluating and recommending component configurations in computing environments as shown includes steps 1402 through 1410, and is suitable for use in the system 100 but is more generally applicable to other types of information processing systems comprising an integration optimization platform configured for automatically evaluating and recommending component configurations in computing environments.

In step 1402, configuration data comprising a plurality of parameters of at least one computing environment is received. One or more of the plurality of parameters correspond to integration of one or more elements of the at least one computing environment with one or more other elements within and/or external to the at least one computing environment. For example, the plurality of parameters comprise a resource naming parameter, a connectivity parameter, an exception parameter and/or an extension parameter. The connectivity parameter comprises a connector type used in a process and/or a connection parameter to connect two or more processes. The exception parameter comprises a try parameter, a catch parameter, a try/catch shape parameter and/or a check connection catch parameter.

In step 1404, the plurality of parameters are analyzed to detect one or more anomalies in the configuration data.

In step 1406, the configuration data and the one or more detected anomalies are inputted to one or more machine learning models, and in step 1408, using the one or more machine learning models, one or more modifications to at least one of the plurality of parameters are determined based on the inputted configuration data and one or more detected anomalies. In step 1410, the determination comprising the one or more modifications is transmitted to a user over a communications network. The configuration data may be received as part of a request from a user for evaluation of the plurality of parameters, and the determination comprising the one or more modifications to the at least one of the plurality of parameters is transmitted to the user as a real-time response to the request.

The one or more machine learning models may comprise an ensemble learning algorithm, such as, for example, an ensemble-bagging algorithm. Ensemble learning uses multiple base models as building blocks for designing more complex models by combining the base models. For example, ensemble methods combine multiple decision tree classifiers to produce improved predictive performance than when utilizing a single decision tree classifier. One way of combining the base models is referred to as "bagging," where a machine learning engine independently learns on homogeneous base models in parallel and combines them in accordance with a deterministic averaging process. In one example, bootstrapping refers to random sampling with replacement, and bagging refers to bootstrap aggregation, which applies the bootstrap procedure to a high-variance machine learning algorithm such as, for example, decision trees. Other methods that may be used for combining base models include, for example, boosting and stacking.

The one or more machine learning models may be trained with historical data comprising a plurality of runtime metrics associated with at least one process, wherein the plurality of runtime metrics comprise a plurality of error logs. In addition, the one or more machine learning models may be trained with data corresponding to the determined modifications to the plurality of parameters. According to an embodiment, determining the one or more modifications comprises using the one or more machine learning models to generate a plurality of predicted parameters based on the inputted configuration data and one or more detected anomalies, and comparing the plurality of parameters with the plurality of predicted parameters to determine one or more differences between the plurality of parameters and the plurality of predicted parameters. The one or more modifications correspond to the one or more differences so that the received plurality of parameters are replaced by different ones of the plurality of predicted parameters.

According to an embodiment, the one or more machine learning models are used to predict a runtime status of one or more processes executed using the plurality of parameters. In addition, one or more of the plurality of parameters may be reconfigured from a first configuration corresponding to a source operating system to a second configuration corresponding to a target operating system in order to provide a solution compatible with multiple different operating systems.

It is to be appreciated that the FIG. 14 process and other features and functionality described above can be adapted for use with other types of information systems configured to execute integration and integration process optimization services in an integration optimization platform or other type of platform.

The particular processing operations and other system functionality described in conjunction with the flow diagram of FIG. 14 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 14 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with an integration optimization platform as disclosed herein can provide a number of significant advantages relative to conventional arrangements. For example, unlike conventional techniques, the embodiments advantageously use machine learning techniques to predict integration component parameters, and provide recommended modifications to integration flows based on comparisons of the predicted parameters with user-provided integration component parameters. The embodiments advantageously use machine learning models to validate integration components syntactically and semantically, as well as predict the runtime outcomes of integration processes. Unlike conventional techniques, the embodiments provide optimal integration flow configurations and use machine learning to automatically provide users with fine-tuned configurations at regular intervals, which minimizes computing environment downtime.

Advantageously, the embodiments provide a technology agnostic platform that can provide recommendations for integration components designed for or on a first operating system, which will be executed on a second operating system running different protocols and code from the first operating system. In other words, the embodiments provide recommended parameters for integration components for execution on any target operating system even though the provided parameters are from any number of different source operating systems. The integration optimization platform therefore includes functionality to reconfigure parameters and integration component code to be compatible with and executed on a variety of different operating systems. For example, all Java® classes are generically built to abstract plug-in extension types from a method or a class to create generic methods or classes applicable to multiple plug-in extension types. As a result, enterprise integrator products from multiple sources can utilize the integration optimization platform. The embodiments accelerate digital transformation for enterprise integration between different source and target operating systems.

As additional advantages, the embodiments, by using machine learning algorithms, such as ensemble machine learning techniques, to provide recommended integration component configurations, improve resource naming standards, development code quality, and the phases of the software development life cycle (SDLC) in connection with integration of computing environments.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the integration optimization platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and an integration optimization platform in illustrative embodiments. These and other cloud-based systems in illustrative embodiments can include object stores.

Illustrative embodiments of processing platforms will now be described in greater detail with reference to FIGS. 15 and 16. Although described in the context of system 100, these platforms may also be used to implement at least portions of other information processing systems in other embodiments.

Figure 15:
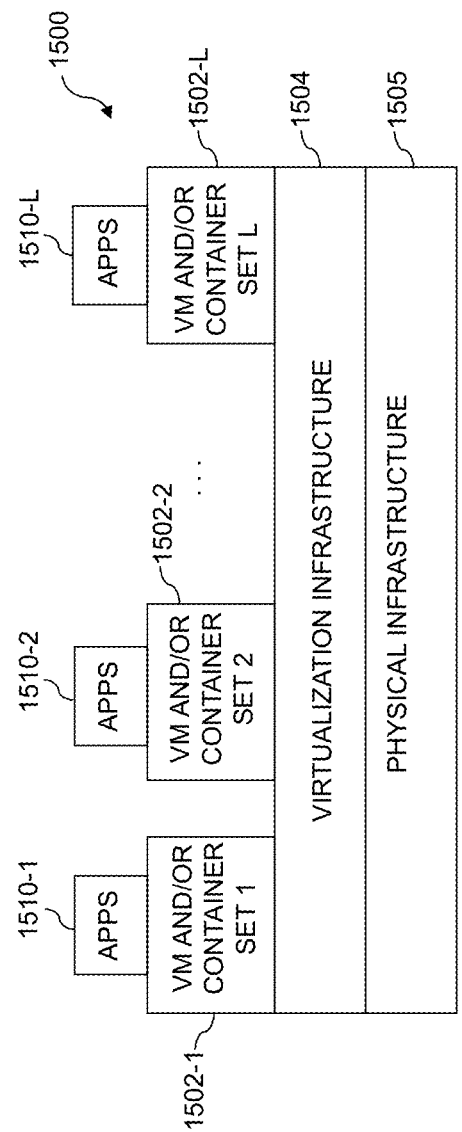
FIGS. 15 and 16 show examples of processing platforms that may be utilized to implement at least a portion of an information processing system according to illustrative embodiments.
Figure 16:
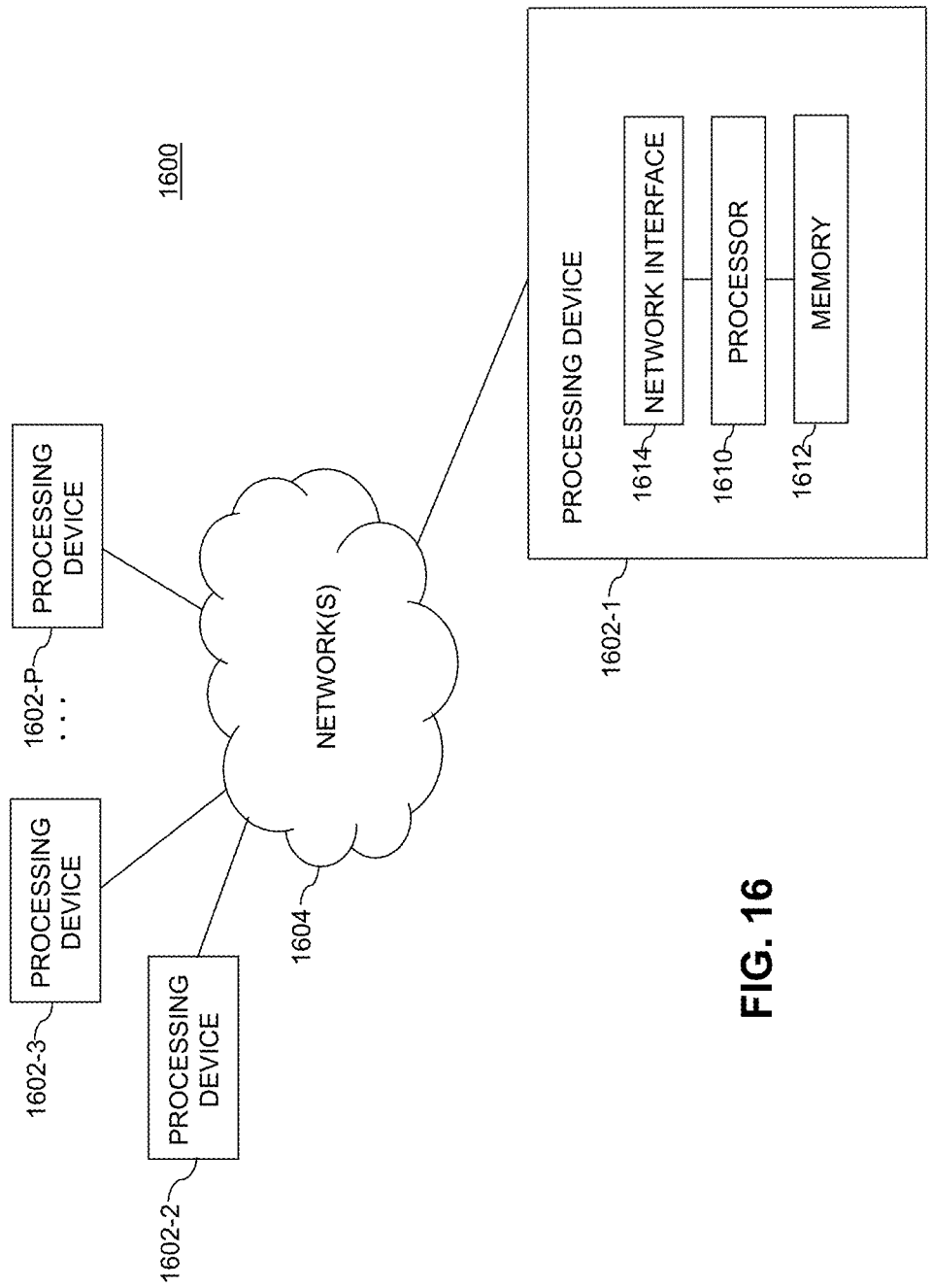

FIG. 15 shows an example processing platform comprising cloud infrastructure 1500. The cloud infrastructure 1500 comprises a combination of physical and virtual processing resources that may be utilized to implement at least a portion of the information processing system 100. The cloud infrastructure 1500 comprises multiple virtual machines (VMs) and/or container sets 1502-1, 1502-2, . . . 1502-L implemented using virtualization infrastructure 1504. The virtualization infrastructure 1504 runs on physical infrastructure 1505, and illustratively comprises one or more hypervisors and/or operating system level virtualization infrastructure. The operating system level virtualization infrastructure illustratively comprises kernel control groups of a Linux operating system or other type of operating system.

The cloud infrastructure 1500 further comprises sets of applications 1510-1, 1510-2, . . . 1510-L running on respective ones of the VMs/container sets 1502-1, 1502-2, . . . 1502-L under the control of the virtualization infrastructure 1504. The VMs/container sets 1502 may comprise respective VMs, respective sets of one or more containers, or respective sets of one or more containers running in VMs.

In some implementations of the FIG. 15 embodiment, the VMs/container sets 1502 comprise respective VMs implemented using virtualization infrastructure 1504 that comprises at least one hypervisor. A hypervisor platform may be used to implement a hypervisor within the virtualization infrastructure 1504, where the hypervisor platform has an associated virtual infrastructure management system. The underlying physical machines may comprise one or more distributed processing platforms that include one or more storage systems.

In other implementations of the FIG. 15 embodiment, the VMs/container sets 1502 comprise respective containers implemented using virtualization infrastructure 1504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1500 shown in FIG. 15 may represent at least a portion of one processing platform. Another example of such a processing platform is processing platform 1600 shown in FIG. 16.

The processing platform 1600 in this embodiment comprises a portion of system 100 and includes a plurality of processing devices, denoted 1602-1, 1602-2, 1602-3, . . . 1602-P, which communicate with one another over a network 1604.

The network 1604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1602-1 in the processing platform 1600 comprises a processor 1610 coupled to a memory 1612. The processor 1610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1612 may comprise random access memory (RAM), read-only memory (ROM), flash memory or other types of memory, in any combination. The memory 1612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1602-1 is network interface circuitry 1614, which is used to interface the processing device with the network 1604 and other system components, and may comprise conventional transceivers.

The other processing devices 1602 of the processing platform 1600 are assumed to be configured in a manner similar to that shown for processing device 1602-1 in the figure.

Again, the particular processing platform 1600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the integration optimization platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and integration optimization platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising a plurality of processing devices;
said at least one processing platform being configured:
to train one or more machine learning models with data comprising a plurality of runtime metrics associated with at least one process;
to receive configuration data comprising a plurality of parameters of at least one computing environment, wherein one or more of the plurality of parameters correspond to integration of one or more elements of the at least one computing environment with one or more other elements at least one of within and external to the at least one computing environment;
to analyze the plurality of parameters to detect one or more anomalies in the configuration data;
to input the configuration data and input the one or more detected anomalies to the one or more machine learning models;
to determine, using the one or more machine learning models, one or more modifications to at least one of the plurality of analyzed parameters based on the inputted configuration data and the inputted one or more detected anomalies;
to transmit the determination comprising the one or more modifications to a user over a communications network;

to receive feedback data about a viability of the one or more modifications;
to retrain the one or more machine learning models with the received feedback data;
to cause reconfiguration of one or more of the plurality of analyzed parameters from a first configuration corresponding to a source operating system to a second configuration corresponding to a target operating system, wherein the second configuration is based at least in part on differences in at least one of protocols and code between the source operating system and the target operating system; and
to automatically initiate one or more changes corresponding to reconfiguring at least one of the one or more elements and the one or more other elements based on the second configuration to proactively eliminate one or more runtime errors during the integration.

2. The apparatus of claim 1 wherein the plurality of parameters comprises one or more of a resource naming parameter, a connectivity parameter, an exception parameter and an extension parameter.

3. The apparatus of claim 2 wherein the connectivity parameter comprises one or more of a connector type used in a process and a connection parameter to connect two or more processes.

4. The apparatus of claim 2 wherein the exception parameter comprises one or more of a try and a catch parameter.

5. The apparatus of claim 4 wherein the exception parameter further comprises a try/catch shape parameter.

6. The apparatus of claim 4 wherein the exception parameter further comprises a check connection catch parameter.

7. The apparatus of claim 1 wherein the one or more machine learning models comprises an ensemble learning algorithm.

8. The apparatus of claim 1 wherein the plurality of runtime metrics comprises a plurality of error logs.

9. The apparatus of claim 1 wherein said at least one processing platform is further configured to retrain the one or machine learning models with data corresponding to the determination comprising the one or more modifications to the at least one of the plurality of analyzed parameters.

10. The apparatus of claim 1 wherein, in determining the one or more modifications to the at least one of the plurality of analyzed parameters, said at least one processing platform is further configured:
to generate, using the one or more machine learning models, a plurality of predicted parameters based on the inputted configuration data and the inputted one or more detected anomalies; and
to compare the plurality of analyzed parameters with the plurality of predicted parameters to determine one or more differences between the plurality of analyzed parameters and the plurality of predicted parameters;
wherein the one or more modifications correspond to the one or more differences.

11. The apparatus of claim 1 wherein said at least one processing platform is further configured to predict, using the one or more machine learning models, a runtime status of one or more processes executed using the plurality of analyzed parameters.

12. The apparatus of claim 1 wherein:
the configuration data is received as part of a request from the user for evaluation of the plurality of parameters; and
the determination comprising the one or more modifications to the at least one of the plurality of analyzed parameters is transmitted to the user as a real-time response to the request.

13. A method comprising:
training one or more machine learning models with data comprising a plurality of runtime metrics associated with at least one process;
receiving configuration data comprising a plurality of parameters of at least one computing environment, wherein one or more of the plurality of parameters correspond to integration of one or more elements of the at least one computing environment with one or more other elements at least one of within and external to the at least one computing environment;
analyzing the plurality of parameters to detect one or more anomalies in the configuration data;
inputting the configuration data and inputting the one or more detected anomalies to the one or more machine learning models;
determining, using the one or more machine learning models, one or more modifications to at least one of the plurality of analyzed parameters based on the inputted configuration data and the inputted one or more detected anomalies;
transmitting the determination comprising the one or more modifications to a user over a communications network;
receiving feedback data about a viability of the one or more modifications;
retraining the one or more machine learning models with the received feedback data;
causing reconfiguration of one or more of the plurality of analyzed parameters from a first configuration corresponding to a source operating system to a second configuration corresponding to a target operating system, wherein the second configuration is based at least in part on differences in at least one of protocols and code between the source operating system and the target operating system; and
automatically initiating one or more changes corresponding to reconfiguring at least one of the one or more elements and the one or more other elements based on the second configuration to proactively eliminate one or more runtime errors during the integration;
wherein the method is performed by at least one processing platform comprising at least one processing device comprising a processor coupled to a memory.

14. The method of claim 13 wherein determining the one or more modifications to the at least one of the plurality of analyzed parameters comprises:
generating, using the one or more machine learning models, a plurality of predicted parameters based on the inputted configuration data and the inputted one or more detected anomalies; and
comparing the plurality of analyzed parameters with the plurality of predicted parameters to determine one or more differences between the plurality of analyzed parameters and the plurality of predicted parameters;
wherein the one or more modifications correspond to the one or more differences.

15. The method of claim 13 further comprising predicting, using the one or more machine learning models, a runtime status of one or more processes executed using the plurality of analyzed parameters.

16. The method of claim 13 wherein:
the configuration data is received as part of a request from the user for evaluation of the plurality of parameters; and
the determination comprising the one or more modifications to the at least one of the plurality of analyzed parameters is transmitted to the user as a real-time response to the request.

17. A computer program product comprising a non-transitory processor-readable storage medium having stored therein program code of one or more software programs, wherein the program code when executed by at least one processing platform causes said at least one processing platform:
to train one or more machine learning models with data comprising a plurality of runtime metrics associated with at least one process;
to receive configuration data comprising a plurality of parameters of at least one computing environment, wherein one or more of the plurality of parameters correspond to integration of one or more elements of the at least one computing environment with one or more other elements at least one of within and external to the at least one computing environment;
to analyze the plurality of parameters to detect one or more anomalies in the configuration data;
to input the configuration data and input the one or more detected anomalies to the one or more machine learning models;
to determine, using the one or more machine learning models, one or more modifications to at least one of the plurality of analyzed parameters based on the inputted configuration data and the inputted one or more detected anomalies;
to transmit the determination comprising the one or more modifications to a user over a communications network;
to retrain the one or more machine learning models with the received feedback data; and
to cause reconfiguration of one or more of the plurality of analyzed parameters from a first configuration corresponding to a source operating system to a second configuration corresponding to a target operating system, wherein the second configuration is based at least in part on differences in at least one of protocols and code between the source operating system and the target operating system; and
to automatically initiate one or more changes corresponding to reconfiguring at least one of the one or more elements and the one or more other elements based on the second configuration to proactively eliminate one or more runtime errors during the integration.

18. The computer program product according to claim 17 wherein, in determining the one or more modifications to the at least one of the plurality of analyzed parameters, the program code causes said at least one processing platform:
to generate, using the one or more machine learning models, a plurality of predicted parameters based on the inputted configuration data and the inputted one or more detected anomalies; and
to compare the plurality of analyzed parameters with the plurality of predicted parameters to determine one or more differences between the plurality of analyzed parameters and the plurality of predicted parameters;
wherein the one or more modifications correspond to the one or more differences.

19. The computer program product according to claim 17 wherein the program code further causes said at least one processing platform to predict, using the one or more machine learning models, a runtime status of one or more processes executed using the plurality of analyzed parameters.

20. The computer program product according to claim 17 wherein:
the configuration data is received as part of a request from the user for evaluation of the plurality of parameters; and
the determination comprising the one or more modifications to the at least one of the plurality of analyzed parameters is transmitted to the user as a real-time response to the request.

* * * * *